United States Patent
Obrecht et al.

(10) Patent No.: US 9,283,726 B2
(45) Date of Patent: Mar. 15, 2016

(54) WIND TURBINE BLADE SEGMENT AND METHOD OF MANUFACTURING THE WIND TURBINE BLADE SEGMENT

(71) Applicants: John M. Obrecht, Louisville, CO (US); Luis A. Mailly, Lafayette, CO (US)

(72) Inventors: John M. Obrecht, Louisville, CO (US); Luis A. Mailly, Lafayette, CO (US)

(73) Assignee: Siemens Aktiengesellschaft, München (DE)

( * ) Notice: Subject to any disclaimer, the term of this patent is extended or adjusted under 35 U.S.C. 154(b) by 224 days.

(21) Appl. No.: 14/073,953

(22) Filed: Nov. 7, 2013

(65) Prior Publication Data
US 2015/0123323 A1   May 7, 2015

(51) Int. Cl.
*B29C 70/76* (2006.01)
*B29D 99/00* (2010.01)
*B29C 70/44* (2006.01)
*B29C 70/54* (2006.01)
*B29C 33/00* (2006.01)
*B29K 307/04* (2006.01)
*B29K 101/10* (2006.01)

(52) U.S. Cl.
CPC ........ *B29D 99/0028* (2013.01); *B29C 33/0044* (2013.01); *B29C 70/443* (2013.01); *B29C 70/546* (2013.01); *B29K 2101/10* (2013.01); *B29K 2307/04* (2013.01); *Y02P 70/523* (2015.11)

(58) Field of Classification Search
None
See application file for complete search history.

(56) References Cited

U.S. PATENT DOCUMENTS

| | | | |
|---|---|---|---|
| 4,709,714 A * | 12/1987 | Nishino et al. | 134/89 |
| 7,334,989 B2 | 2/2008 | Arelt | |
| 7,922,454 B1 | 4/2011 | Riddell | |
| 2007/0003415 A1 | 1/2007 | Gigas et al. | |
| 2008/0181781 A1 | 7/2008 | Livingston et al. | |
| 2009/0155084 A1 | 6/2009 | Livingston et al. | |
| 2009/0162206 A1 | 6/2009 | Zirin et al. | |
| 2010/0304170 A1* | 12/2010 | Frederiksen | 428/542.8 |
| 2011/0046771 A1 | 2/2011 | Alms et al. | |
| 2011/0052403 A1 | 3/2011 | Kawasetsu et al. | |

FOREIGN PATENT DOCUMENTS

| | | | | |
|---|---|---|---|---|
| EP | 1428650 A1 | 6/2004 | | |
| EP | 2033769 A1 | 3/2009 | | |
| EP | 2319683 A1 | 5/2011 | | |
| GB | 2162791 | * 2/1986 | ............. | B29C 65/08 |
| WO | 2006002621 A1 | 1/2006 | | |

OTHER PUBLICATIONS

Sara Black, New Infusion Regime for Superthick Laminates, http://www.compositesworld.com/articles/new-infusion-regime-for-superthick-laminates, Jan. 14, 2010.
Green P.; "Fiber volume fraction determination of carbon-epoxy composites using an acid digestion bomb"; Journal of Materials Science Letters; No. 10; p. 1162; XP002737429.

* cited by examiner

*Primary Examiner* — Monica Huson

(57) ABSTRACT

A method of forming a wind turbine component, the method including forming a segment (10, 12) by impregnating a portion (18, 20) of a fiber reinforcement (50) with a thermoset resin (60) up to a boundary (56), curing the thermoset resin, and leaving unimpregnated fiber reinforcement (22) extending from the boundary. The component may then be assembled by impregnating and joining the unimpregnated fiber reinforcement of two such segments.

23 Claims, 4 Drawing Sheets

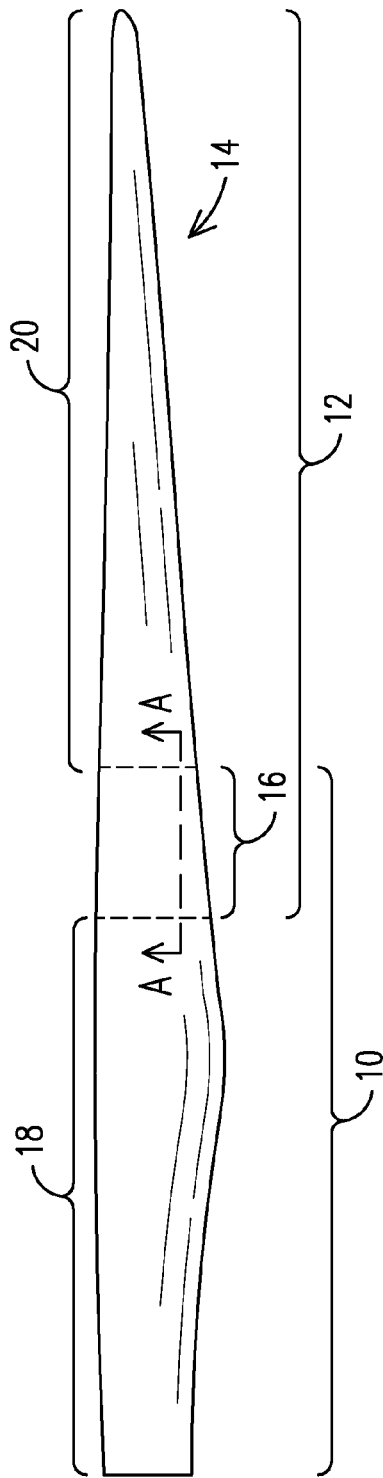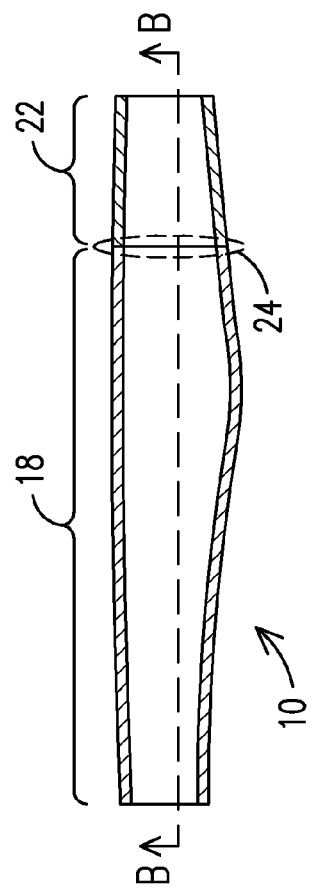
FIG. 1
FIG. 2

WIND TURBINE BLADE SEGMENT AND METHOD OF MANUFACTURING THE WIND TURBINE BLADE SEGMENT

FIELD OF THE INVENTION

The invention relates to manufacturing a wind turbine blade segment having fiber reinforcement partially infused with thermoset resin up to a predefined, controlled boundary from which uninfused fiber reinforcement protrudes.

BACKGROUND OF THE INVENTION

Wind turbines rely on wind turbine blades to extract energy from the wind to generate electrical power. In the current state of the art larger blades on the order of fifty meters or more are being used in order to extract more energy. These blades are often manufactured at a facility and transported to a wind farm for final assembly into a wind turbine. The size, and in particular, the length of the blades poses logistical problems during the transportation step due to limitations of the transportation infrastructure, including roadways, bridges, and in particular railway etc.

Industry has proposed various solutions to alleviate the transportation problems, including fabricating the blades in multiple pieces. These pieces may be assembled together at the wind farm to form the blade, usually by joining rigid components using fasteners such as bolts and optionally applying an adhesive. However, the blades formed using these methods still include bolted joints and these bolted joints may not endure as well as a cast blade would. One recently proposed blade assembly technique proposes manufacturing multiple blade segments where each blade segment is to have fiber reinforcement partially infused with thermoset resin (whose contour matches a shape of a respective portion of the blade) and an uninfused, loose-weave portion of the fiber reinforcement. The segments are transported to a remote location where the uninfused portion of the fiber reinforcement of one segment can be joined with an uninfused portion of the fiber reinforcement of an adjacent segment in an in-situ casting operation to form a monolithic blade.

While conventional manufacturing techniques are capable of forming these segments, there is a wide variety of ways these segments can be manufactured and each faces its own precision and tolerance control problems. Consequently, there is room in the art for improvement.

BRIEF DESCRIPTION OF THE DRAWINGS

The invention is explained in the following description in view of the drawings that show:

FIG. 1 is a schematic representation of exemplary embodiments of two segments of a wind turbine blade positioned for final processing into a finished wind turbine blade.

FIG. 2 is a schematic representation of an exemplary embodiment of a base segment of FIG. 1.

DETAILED DESCRIPTION OF THE INVENTION

Figure 3:
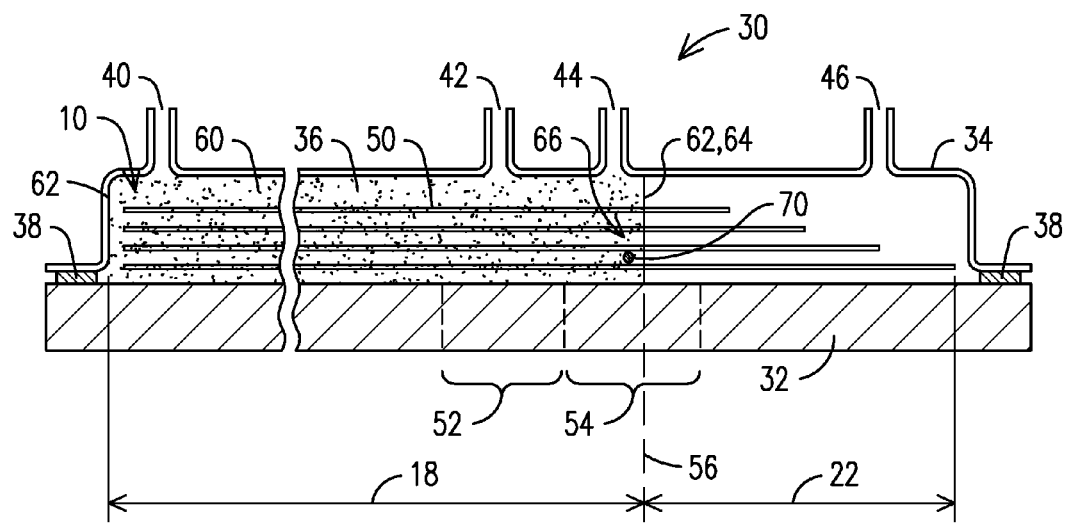
FIG. 3 is a schematic representation of a cross section along line B-B of the base segment of FIG. 2 as positioned in a partial longitudinal cross section of an exemplary embodiment of a mold assembly used during an exemplary embodiment of a single-pour manufacturing process.

The present inventors have developed novel methods based on a single concept for forming a segment of a wind turbine blade having fiber reinforcement partially impregnated with thermoset resin up to a boundary and unimpregnated fiber reinforcement extending from the boundary. The concept includes limiting a flow of thermoset resin across a location desired for the boundary, where the location is positioned to leave unimpregnated fiber within the mold and extending from the boundary. Various methods can be used to affect the curing at the proper location and these methods are disclosed herein. A segment may be a span-wise portion of the blade, or other blade parts such as upper and lower skin halves. The joining of span-wise blade portions may occur in the field, and joining of the other blade parts may occur at the manufacturing site or in the field.

FIG. 1 shows a schematic representation of exemplary embodiments of a base segment 10 and an additional segment 12 of a wind turbine blade positioned as an unfinished wind turbine blade 14 and ready for final processing into a finished wind turbine blade. The unfinished wind turbine blade 14 includes a loose-weave region 16 within which unimpregnated fiber from the base segment 10 overlaps unimpregnated fiber reinforcement from the additional segment 12. An impregnated portion 18 of the base segment 10 will become a respective part of the finished wind turbine blade and consequently is shaped accordingly. Likewise, an impregnated portion 20 of the additional segment 12 will also become a respective part of the finished wind turbine blade and consequently is shaped accordingly. The unimpregnated fiber reinforcement in the loose-weave region 16 does not take shape until final assembly which occurs in an assembly jig. FIG. 2 shows a schematic representation of an exemplary embodiment of a base segment 10 of FIG. 1 having a base segment impregnated fiber reinforcement portion 18 with a boundary 24 and a base segment unimpregnated fiber reinforcement portion 22.

FIG. 3 is a schematic representation of a cross section along line B-B of the base segment 10 of FIG. 2 as positioned in a partial longitudinal cross section of an exemplary embodiment of a mold assembly 30 used during an exemplary embodiment of a single-pour manufacturing process. The base segment 10 is hollow as is the mold assembly 30 and in this view only a bottom portion of the cross section (below the hollow portion of the blade and mold assembly 30) is visible. A full longitudinal cross section would include additional structure above that which is visible in FIG. 3 and would represent a top (other side of the hollow interior) of the blade and mold assembly 30. However, only the bottom portion is shown for simplicity.

In this exemplary embodiment the entire base segment 10 is positioned within the mold assembly 30 which may include an outer mold 32 and an inner mold 34 that define a sealed chamber 36, seals 38, and up to at least four ports 40, 42, 44, and 46. As shown the ports 40, 42, 44, 46 provide access through the inner mold 34. Alternately, or in addition, ports could provide access through the outer mold 32. In an exemplary embodiment that uses a vacuum assisted resin transfer molding (VARTM) the inner mold 34 may be a flexible vacuum bag that may deform and press on the fiber reinforcement 50 in response to a vacuum applied between outer mold 32 and the inner mold 34. The mold assembly 30 may include one or more temperature control regions 52, 54.

The fiber reinforcement 50 may be loose fiber (glass or carbon) weave or rovings, or a partial loose weave/partial pre-impregnated fiber combination. The thermoset resin may be epoxy or any other suitable resin material. Within the mold assembly 30 loose fiber is laid up in an arranged fashion for structural loading purposes, and there may also exist other materials in the lay-up to round out the shape of the blade. Air is removed from the sealed chamber 36 via a vacuum pump. The thermoset resin can then be introduced into the sealed chamber 36 (into the cast), either with a positive pressure, or by allowing the (relatively) negative pressure from the vacuum pump to draw the thermoset resin into the sealed chamber 36/cast.

Controlling the flow rate of the thermoset resin so that a boundary 24 of the base segment impregnated fiber reinforcement portion 18 is formed at a desired boundary location 56 in the mold assembly 30 may be accomplished in a variety of ways when using this exemplary embodiment of the mold assembly 30. In general terms this may be accomplished by causing a flow front (i.e. a leading edge) of a flow of thermoset resin to cure sufficiently so that is stops flowing at the desired boundary location 56, (which, in turn, means the sufficient curing of an associated flow front portion of the flow), or by placing a physical stop so that the thermoset resin flow is stopped and cures at the desired boundary location 56. It is desirable that the boundary 24 be very ordered and distinct (sharp) such that, to the extent possible, the variation in radial extent at different positions around the circumference of the blade segment is minimized. Stated another way, the boundary 24 is to end sharply and at the desired boundary location 56.

In exemplary embodiments where a cure of a flow front (and hence, the flow front portion) of the thermoset resin is to be controlled to "self-form" the boundary 24 in the desired boundary location 56, particular attention must be paid to the flow rate of the thermoset resin. By controlling the flow rate the location of the flow front can be controlled. By causing the flow front to be at the desired boundary location 56 when the flow front cures enough (becomes sufficiently viscous) to stop flowing, the boundary 24 can be formed where desired. The flow rate is highly dependent on three key parameters: 1) a viscosity of the thermoset resin; 2) a geometry of the mold assembly 30 and cast; and 3) a differential pressure between the ports 40, 42, 44, and 46.

The viscosity of the thermoset resin can be controlled both spatially and temporally by controlling the temperature of the thermoset resin and/or by controlling the chemical composition of the thermoset resin, (for example, with a catalyst). The geometry of the mold and the cast can be controlled by design, (permeability control). The differential pressure can be controlled by controlling the pressure at the respective ports 40, 42, 44, and 46. Detailed knowledge of the properties of the thermoset resin are critical to enable control of the thermoset resin as disclosed herein. If not already available via existing literature specific information can be determined through experimentation.

The base segment 10 can be formed during an exemplary embodiment of a single pour operation using the mold assembly 30 of FIG. 3 to control pressure. Specifically, a pressure at port 46 is set relative to a pressure at port 44 so that thermoset resin 60 introduced via port 44 will not travel toward port 46. This may be accomplished, for example, by having an equal or higher pressure at port 46 than at port 44. Port 42 is closed, and a vacuum is applied at port 40 to draw the thermoset resin toward port 40. Breather material (not shown) may be strategically placed to distribute the pressures along circumferential strips associated with the ports. In this exemplary embodiment the flow of thermoset resin may have edges 62; one at each end of the flow. The flow front 64 is the particular edge that cures at the desired boundary location 56 and forms the boundary 24. A condition of a portion 66 of the flow of thermoset resin 60 proximate the flow front 64 will essentially govern the condition of the flow front 64. Stated another way, the flow front 64 cure can be modeled by modeling the condition of the thermoset resin 60 proximate the flow front 64.

Likewise, the mold of FIG. 3 can be used to form the base segment 10 during an alternate exemplary embodiment of a single pour operation to control viscosity using a catalytic agent. Specifically, thermoset resin 60 may be injected at port 40, a vacuum may be applied at port 42, the catalytic agent may be injected at port 44, and positive pressure with respect to port 44 may be applied at port 46. Alternately, the catalytic agent could be applied to the fiber reinforcement 50 (the lay-up) proximate the desired boundary location 56 such that the flow front 64 cures at the desired boundary location 56. As used herein, proximate means wherever necessary to effect the cure of the flow front at the desired boundary location 56 when all factors are considered. Alternately, ultraviolet light, ultrasound, or any other method known in the art to effect cure can be applied.

The mold of FIG. 3 can be used to form the base segment 10 during an alternate exemplary embodiment of a single pour operation to control viscosity by applying heat to the thermoset resin and/or mold in a systematic way. Specifically, warm thermoset resin 60 may be injected via port 40, and temperature control region 54 may be heated to a temperature much hotter than temperature control region 52. In this arrangement the thermoset resin 60 that reaches temperature control region 54 will cure relatively quickly upon arrival and the flow front 64 will form the boundary 24 at the desired boundary location 56. Thermoset resin that traverses temperature control region 52 will not cure as quickly and this will enable its transport through temperature control region 52 and into temperature control region 54 for quick curing where desired. Alternately, a fiber element 70, which may be an individual fiber or collection of fibers, may be used as a resistive heating element to deliver the thermal energy where necessary. For example, the fiber element 70 may be installed proximate the desired boundary location and oriented circumferentially. By doing this the fiber element 70 will be able to provide the necessary heat energy to effect curing of the flow front 64 at the desired boundary location 56. Carbon fiber is electrically conductive yet resistive enough to provide a desired heating effect, making it a suitable material for such an arrangement. However, other materials may be used so long as they provide the desired effect.

Figure 4:
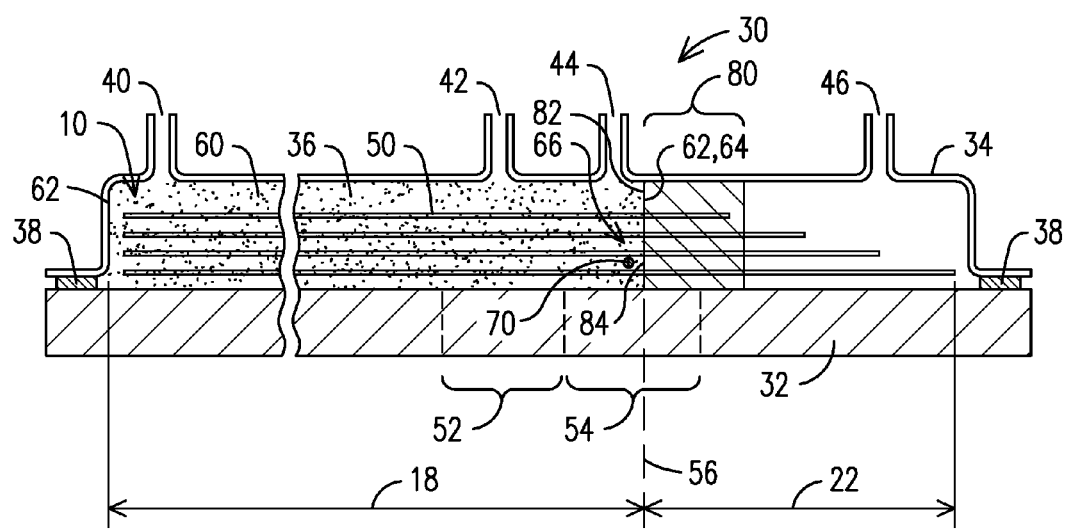
FIG. 4 is a schematic representation of a cross section along line B-B of the base segment of FIG. 2 as positioned in a partial longitudinal cross section of an exemplary embodiment of a mold assembly used during an alternate exemplary embodiment of a single-pour manufacturing process.

In other exemplary embodiments, instead of controlling a cure of the flow front to form the boundary 24 in the desired boundary location 56, a flow obstruction may be used to reduce permeability, such as gelled thermoset resin or a physical stop (no permeability despite possible pressure difference). For example, the base segment 10 can be formed during an alternate exemplary embodiment of a single pour operation using the mold assembly 30 of FIG. 3 to control permeability as shown in FIG. 4 via gelled thermoset resin. Specifically, the viscosity of the thermoset resin 60 may be increased to the right of the temperature control region 54 through cooling. Cooling can be affected by any means known to those in the art, including thermoelectric coolers, water coolers etc. This will gel a flow front portion 80 of the thermoset resin 60 to the right of the desired boundary location 56 and the gelled flow front portion 80 will act as a plug with a trailing edge 82 at the desired boundary location 56. Behind the gelled thermoset resin is uncured/liquid thermoset resin 60 with a liquid flow front 84 abutting the trailing edge 82. Since it cannot flow past the trailing edge 82, the liquid flow front 84 will cure at the desired boundary location 56 thereby forming the boundary 24. After the boundary 24 has been formed the gelled thermoset resin can be removed before it cures, freeing the remaining thermoset resin to fully cure.

Alternately, to control permeability a local region of the fiber reinforcement may be characterized by a different density than other regions. Fiber reinforcement with a different density will exhibit a different capillary action, and hence a different permeability. Further, a pattern of the fibers in the fiber reinforcement might be altered locally. The fibers govern the capillary channels, so the change in direction of the fibers will change a direction of the capillary action. Hence, thermoset resin can be directed toward or away from a local region as desired.

Figure 5:
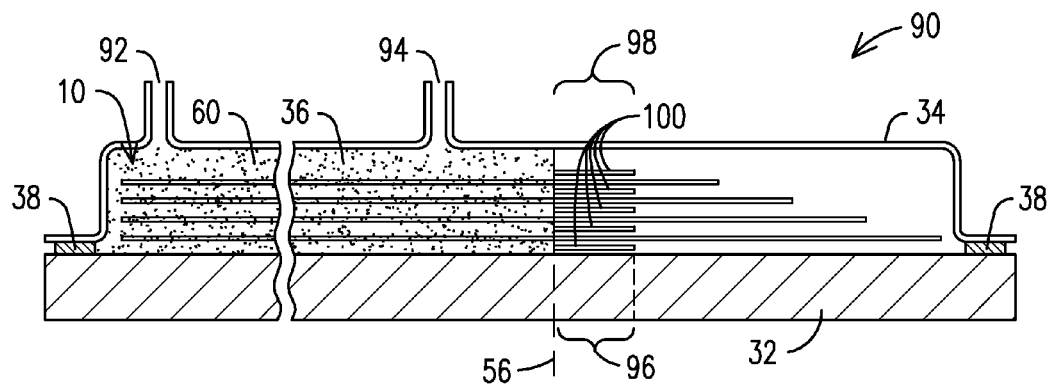
FIG. 5 is a schematic representation of the cross section along line B-B of an exemplary embodiment of fiber reinforcement of the base segment of FIG. 2 as positioned in a partial longitudinal cross section of an alternate exemplary embodiment of a mold assembly used during an alternate exemplary embodiment of a single-pour manufacturing process.

The base segment 10 can be formed during an alternate exemplary embodiment of a single pour operation using the mold assembly 90 of FIG. 5 to control permeability using a physical stop. Mold assembly 90 has ports 92 and 94 and an optional heat-controlled zone 96. A vacuum-proof physical stop 98 may be formed in the mold assembly 90 and be effective to prevent the flow of thermoset resin 60 from flowing past the desired boundary location 56. The physical stop 98 may be formed by applying a material 100 to the lay-up, for example, to every sheet or every other sheet etc. The material 100 could be wet lay-up thermoset resin, wax, rubber, thermoplast, a staged thermoset resin-film, or co-mingled preforms and the optional heat-controlled zone 96 may affect a sealing of the materials to each other and/or the fibers of the fiber reinforcement 50. To impregnate the fiber reinforcement 50 thermoset resin 60 may be injected through port 92 and a vacuum applied at port 94 so that it flows in the sealed chamber 36 until it is stopped by the physical stop 98 where it will cure to form the boundary 24. The material 100 may then be removed in order to reduce unnecessary materials via dissolving the material by another applied chemical or melting with an applied heat. Alternately, it may not be removed at all.

Figure 6:
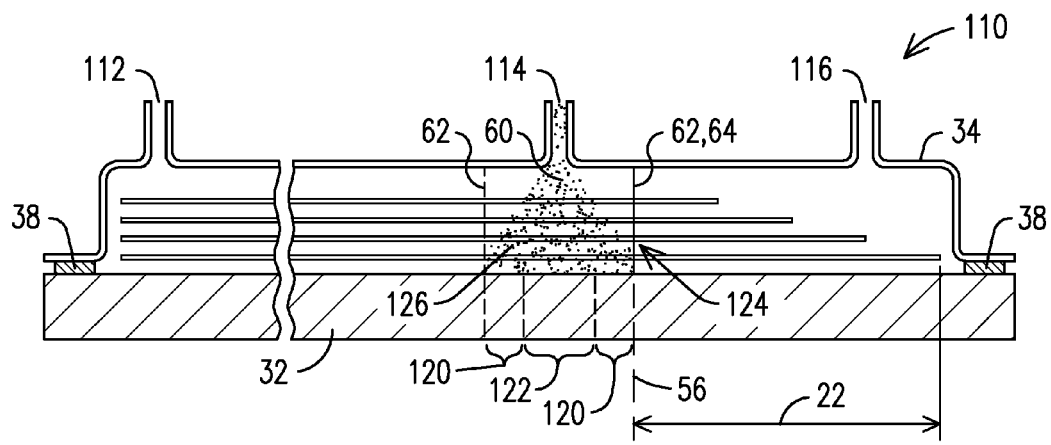
FIG. 6 is a schematic representation of a cross section along line B-B of an exemplary embodiment of fiber reinforcement of the base segment of FIG. 2 as positioned in a partial longitudinal cross section of an alternate exemplary embodiment of a mold assembly used during a first step of an exemplary embodiment of a multi-pour manufacturing process.
Figure 7:
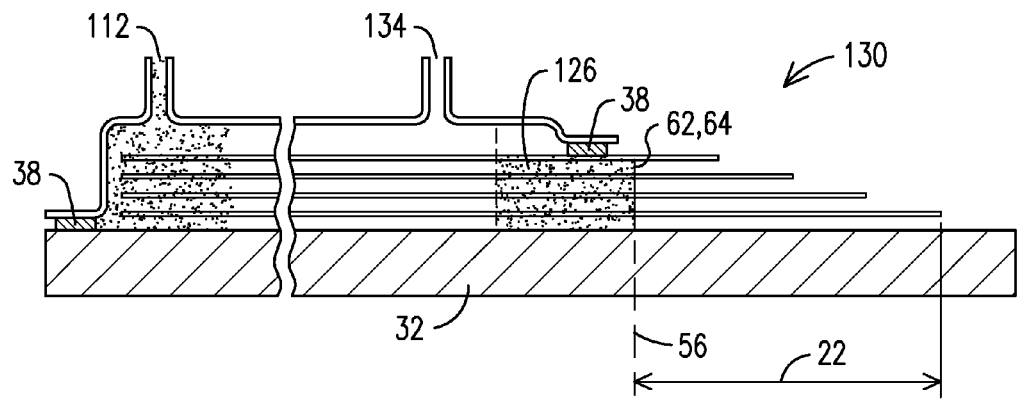
FIG. 7 is a schematic representation of the cross section of the fiber reinforcement of FIG. 6 positioned in a partial longitudinal cross section of an alternate exemplary embodiment of a mold assembly used during a second step of the multi-pour manufacturing process started in FIG. 6.

The base segment 10 can also be formed during an exemplary embodiment of a multiple pour operation where a first pour defines a plug made of cured thermoset resin that stops thermoset resin from a subsequent pour from flowing past the plug. Any of the single pour techniques discussed above can be used to form the first-pour plug in a multi-pour method. An exemplary embodiment of a multi-pour method uses the mold assembly 110 of FIG. 6-7 to control the thermoset resin 60 so that it self-forms a plug (in this exemplary embodiment the plug is annular/ring-shaped) having a boundary 24 at the desired boundary location 56. As can be seen in FIG. 6 a vacuum is applied at ports 112, 116 and thermoset resin 60 is injected in port 114. The mold assembly 110 may include temperature control zones 120 that may be heated and temperature control zone 122 that may be heated but to a lesser degree than temperature control zones 120. The injected thermoset resin 60 will flow relatively readily through temperature control zone 122 and upon entering temperature control zones 120 will begin to cure rapidly. The flow front 64 and flow front portion 124 will be controlled to cure enough to stop flowing when the flow front 64 reaches the desired boundary location 56. Upon sufficient curing the first pour forms the plug 126.

To finish the impregnation in a subsequent step thermoset resin 60 is subsequently poured "behind" (on a side opposite the boundary 24) by introducing the thermoset resin in port 112 and applying a vacuum at port 134. The thermoset resin flows until it abuts the plug 126 of the first pour after which the thermoset resin of the second pour cures, thereby completing the cure and hence the formation of the base segment 10. Any of the above-described single-pour techniques can be applied in any manner desired to either or both steps of a single-pour technique to form the plug 126.

In multi-pour exemplary embodiments the volumes being infused/impregnated during each pour are relatively smaller than the volume being impregnated during a single pour of the same type of segment. Consequently, an advantage of multi-pour exemplary embodiment is that the smaller volumes can be more tightly controlled. In addition, there need be no regard for the curing history of the first pour during the second pour. Further, there can be different thermoset resin chemistries during each pour, or the thermoset resin of one cure can be staged (pre-cured) to different degrees.

After curing of the thermoset resin 60, it may be possible to clean-up the sharpness of the boundary 24. It may also be possible to expose a defined section of fiber reinforcement 50 from a fully impregnated and cured base segment 10. Either of these can be accomplished by removing selected cured thermoset resin 60 through acid digestion. In this process applied acid will remove the selected cured thermoset resin 60 but not any reinforcing fibers.

Figure 8:
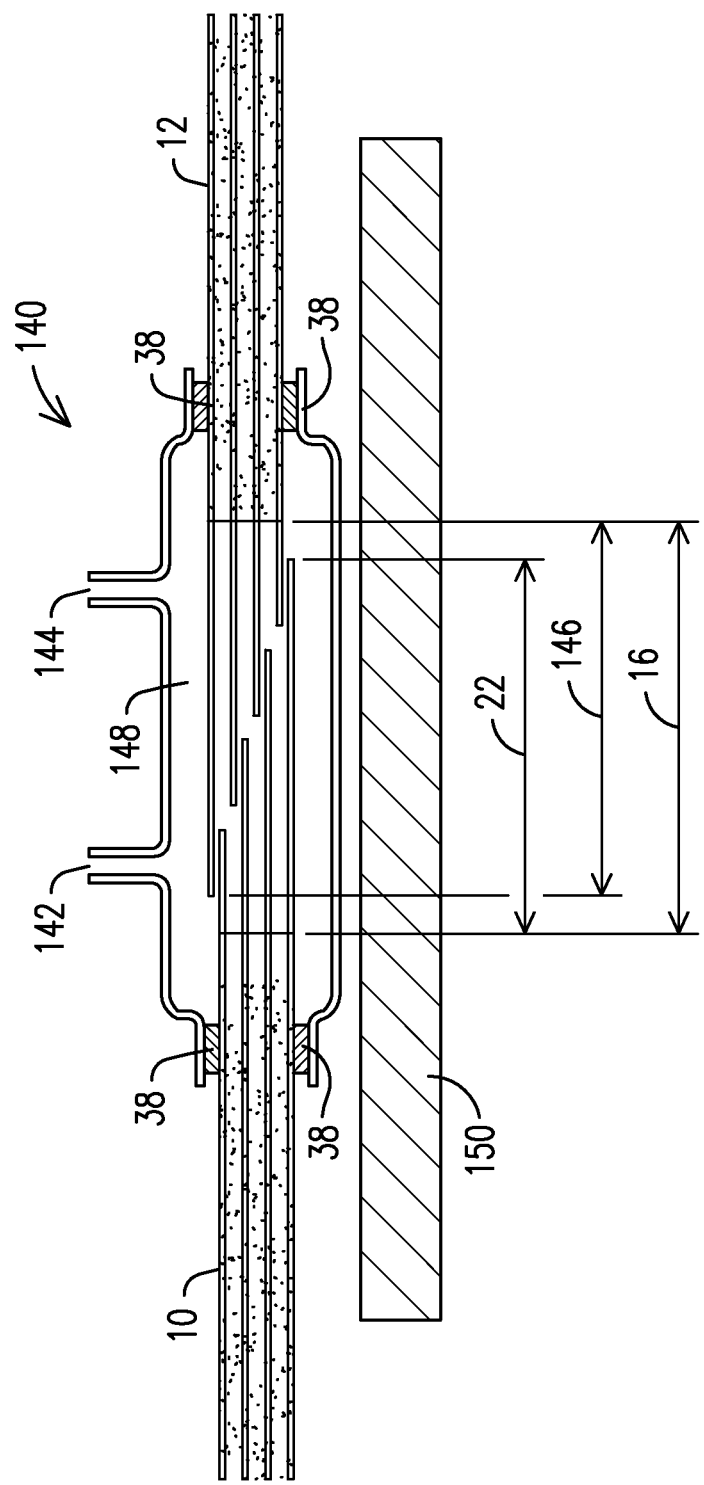
FIG. 8 is a schematic representation of the cross section along A-A of the two segments of FIG. 1 as positioned in a partial longitudinal cross section of an exemplary embodiment of a mold assembly used during an exemplary embodiment of a segment-joining manufacturing process.

Assembly of the base segment 10 and the additional segment 12 may be accomplished using the mold assembly 140 shown in FIG. 8, which shows a partial longitudinal cross section of the two segments 10, 12 of the unfinished wind turbine blade 14 positioned in an assembly jig 150 for final processing into a finished wind turbine blade. The assembly jig may be an external part, a separately manufactured internal sleeve adhered to one part of the blade, or a cured part of the subassemblies to be joined. The base segment unimpregnated fiber reinforcement portion 22 is assembled together with an unimpregnated fiber reinforcement portion 146 of the additional segment 12 within the loose-weave region 16. The loose-weave region 16 is disposed within a sealed cavity 148 of the mold assembly 140. Thermoset resin is injected into port 142 and a vacuum is applied to port 144 until the thermoset resin fills the sealed cavity 148 to form the finished wind turbine blade.

From the foregoing it can be seen that the present inventors have disclosed an innovative solution to wind turbine blade manufacture that can be implemented in a variety of ways and hence the disclosure represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of forming a wind turbine component, the method comprising forming a segment by impregnating a portion of a fiber reinforcement disposed in a mold with a thermoset resin up to a boundary without impregnating a portion of the fiber reinforcement extending from the boundary, and curing the thermoset resin, thereby leaving unimpregnated fiber reinforcement extending from the boundary.

2. The method of claim 1, wherein the fiber reinforcement is disposed in a flexible mold and the thermoset resin is infused in a vacuum assisted liquid molding process.

3. The method of claim 1, further comprising forming the impregnated portion and the boundary in a single pour of the thermoset resin.

4. The method of claim 3, further comprising causing a flow front of a flow of the thermoset resin to cure enough to stop flowing and thereby form the boundary when the flow front reaches a desired boundary location for the boundary.

5. The method of claim 4, further comprising manipulating a local pressure at the desired boundary location to a pressure needed to prevent movement of the flow front past the desired boundary location when the flow front is in a liquid state.

6. The method of claim 4, further comprising applying a catalyst to the thermoset resin proximate the desired boundary location to effect the cure of the flow front of the flow.

7. The method of claim 4, further comprising infusing a catalyst into the thermoset resin to effect the cure of the flow front of the flow.

8. The method of claim 4, further comprising applying heat to the thermoset resin proximate the desired boundary location to effect the cure of the flow front of the flow.

9. The method of claim 4, further comprising using a fiber of the fiber reinforcement as a resistive heating element to heat the thermoset resin proximate the desired boundary location to effect the cure of the flow front of the flow.

10. The method of claim 9, wherein the fiber comprises a carbon fiber.

11. The method of claim 3, further comprising positioning a physical stop at a desired boundary location of the boundary to prevent the thermoset resin from flowing beyond the desired boundary location when in a liquid state and then curing the thermoset resin enough to prevent further any further flowing of the thermoset resin beyond the desired boundary location.

12. The method of claim 11, wherein the physical stop comprises at least one of a wet lay-up thermoset resin, wax, rubber, thermoplast, a staged thermoset resin-film, and a co-mingled preform.

13. The method of claim 12, wherein heat is applied to the physical stop to improve a sealing effect of the physical stop.

14. The method of claim 3, further comprising cooling a local volume of a flow of thermoset resin to form a flow plug adjacent to a desired boundary location of the boundary and curing thermoset resin adjacent the flow plug enough to prevent any further flowing of uncooled resin beyond the boundary.

15. The method of claim 1, further comprising forming the impregnated portion during a first pour of the thermoset resin that defines the boundary and completing the impregnation during a subsequent pour.

16. The method of claim 15, further comprising preventing the thermoset resin of the first pour from flowing beyond a desired boundary location by causing a flow front of a flow of the thermoset resin to cure enough to stop flowing and thereby form the boundary when it reaches the desired boundary location.

17. The method of claim 15, further comprising preventing the thermoset resin of the first pour from flowing beyond a desired boundary location by positioning a physical stop at the desired boundary location and then curing the thermoset resin adjacent the physical stop enough to prevent any further flowing beyond the boundary.

18. The method of claim 15, further comprising preventing the thermoset resin of the subsequent pour from flowing beyond the desired boundary location by using the cured thermoset resin of the first pour as a flow plug.

19. The method of claim 15, wherein the thermoset resin of the subsequent pour comprises at least one of a different chemistry and a different degree of pre-cure than the thermoset resin of the first pour.

20. The method of claim 1, further comprising regulating a flow within a local volume of a flow of thermoset resin by locally changing a rate of capillary action of a material through which the flow in the local volume flows.

21. The method of claim 1, further comprising regulating a flow within a local volume of a flow of thermoset resin by locally changing a direction of capillary action of a material through which the flow in the local volume flows.

22. The method of claim 1, further comprising removing any unwanted cured thermoset material via acid digestion.

23. The method of claim 1, further comprising:
    forming an additional segment using the method steps of claim 1, and
    forming a blade by joining the segment and the additional segment.

* * * * *